March 20, 1973 L. B. MUSTAIN 3,721,343

METHOD OF CHECKING CARD FILE ACTIVITY

Filed May 21, 1971

INVENTOR.

Lewis B. Mustain

BY

Wood, Herron & Evans

ATTORNEYS

United States Patent Office 3,721,343
Patented Mar. 20, 1973

3,721,343

METHOD OF CHECKING CARD FILE ACTIVITY

Lewis B. Mustain, Cincinnati, Ohio, assignor to The Mosler Safe Company, Hamilton, Ohio Filed May 21, 1971, Ser. No. 145,840
Int. Cl. B07c 3/10
U.S. Cl. 209—110.5 4 Claims

ABSTRACT OF THE DISCLOSURE

The activity of edge coded cards stored in a storage compartment of a file is checked by always returning cards to the file at the same relative position in the storage compartment. A distinctive dummy card inserted into the compartment at the infile position enables cards thereafter selected, used and returned to the file to be isolated on one side of the dummy card from the unselected cards. Therefore, any cards still on the unselected card side of the dummy card after a specified period have never been used and may, if so desired, be purged from the file as obsolete or inactive.

BACKGROUND OF THE INVENTION

This invention relates to the maintenance of information storage systems. Specifically, it relates to the maintenance of such systems in which the information is stored on edge coded cards or card-like media, as, for example, paper cards, aperture cards, fiche, microfiche, and film chips.

All information storage systems require some technique for infiling new information into the system, for replacing obsolete information with updated or revised information, and for purging obsolete or inactive information from the system. In order to purge obsolete or inactive information, some technique must be developed for isolating and identifying the unused information. This invention concerns the isolation and identification of unused or inactive information which is stored on cards or card-like media.

In information storage systems in which the information is stored on cards, it is possible to check the activity of the information by checking the activity of the cards upon which the information is stored. As an example, the information stored on a card which has not been pulled for retrieval for a period of years is probably obsolete or inactive and should be purged in order to update the file. This invention is concerned with the identification of those cards which have not been pulled or used for a specified period of time such that cards so identified may be removed or some action taken relative to those cards.

The invention is illustrated and described as applied to a system which utilizes random storage of edge coded cards in a card file or a portion of a file and scanning of all the cards in the selected portion to identify for removal those cards upon which specific information is stored. In this system of randomly filed cards, used cards are always infiled or returned to the file at the same relative position in the file.

This invention is predicated upon the concept of utilizing a distinctive dummy card in a file of edge coded cards to isolate active and inactive cards. Cards are always returned to the file at the same infile position so that a dummy card may be inserted at the infile position and any card thereafter pulled and returned is isolated by being located on one side of the dummy.

The primary advantage of this invention is that it enables unused or inactive cards to be very quickly and simply identified. Additionally, by the use of multiple dummy cards in the system, the degree of inactivity of cards in the file may be checked, as, for example, all cards unused over a ten-year period, a one-year period or a one-day period.

These and other objectives and advantages of this invention will be more readily appreciated from the following description of the drawings in which.

Figure 1:
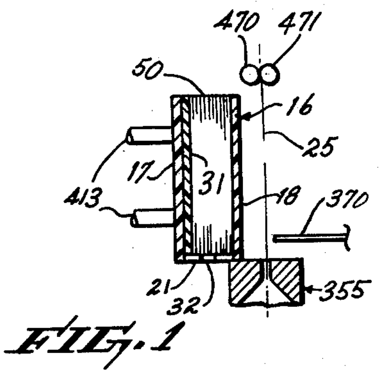
FIG. 1 is a diagrammatic illustration of an information storage system of the type to which this invention is applicable.

Referring first to FIGS. 1–6, there is diagrammatically illustrated the operational cycle of a card selection system of the type to which this invention is applicable. Specifically, there is diagrammatically illustrated in those figures the operational cycle of the document retrieval and handling system illustrated and described in detail in U.S. Patent No. 3,536,194 of Warren D. Novak which issued on Oct. 27, 1970. Other U.S. patents which describe other document retrieval systems of the type to which this invention is applicable are U.S. Patent No. 3,225,770 of Lasley et al. which issued on Dec. 28, 1965 and U.S. Patent No. 3,312,225 of E. T. Irwin which issued on Apr. 4, 1967. All of these patents have in common the fact that documents or cards are randomly stored in a compartment of a card file from which cards may be selectively removed in accordance with edge coded data on the card. In all of these systems, the cards are returned to the file or infiled in the same relative position of the card storage compartment, i.e., at one end of the deck of cards in the compartment.

In the system embodied in the drawings of this application, which system diagrammatically illustrates the operation of the system described in U.S. Pat. No. 3,536,194, cards 50 are stored in cartridges or compartments 16. Each cartridge or compartment comprises a front wall 17, a rear wall 18, a pair of side walls 19 and 20, and a bottom wall 21. The bottom wall has a large central opening 32 through which an air stream may be directed upwardly so as to eject preselected cards from the deck In essence, then the bottom wall 21 consists of little more than a pair of ledges located along the lateral sides of the opening for supporting the edges of the cards contained in the cartridge or compartment 16. The top of the cartridge is open so that preselected cards may be ejected through the open top.

The cards 50 are all edge coded by notches 52 located along the bottom edge of the card. To restrain all but a selected card against movement, all of the cards 50 contained in the deck have apertures or holes 53 located at all unnotched notch sites such that card selection needles 370 or rods may be inserted through the front 17 and rear 18 walls of the cartridge and through selected notch sites to hold all but selected ones of the cards against movement when an air stream is directed upwardly through the deck from a nozzle 355 located beneath the cartridge.

In order to extract cards from the deck, there is a pair of drive rollers 470, 471 located above the deck in the plane of the nozzle orifice. These rollers catch and continue upwardly cards partially ejected from the deck by the air stream. These cards are picked up between the nip of the rollers 470, 471 and driven upwardly the remainder of the distance out of the deck. Similarly, cards are returned to the deck by being driven downwardly through these same drive rollers 470, 471.

Mounted against the front wall 17 of the compartment or cartridge 16 on the inside of the cartridge, there is a pressure plate 31. This plate is nothing more than a rigid plastic plate which when pushed rearwardly or toward the rear wall 18 causes all of the cards contained in the cartridge to be pushed into a vertical plane and aligned so that selector needles or rods 370 may be inserted through the aligned notch sites 53 of the cards. Pressure is applied to the pressure plate 31 by a series of spider fingers 413 insertable through apertures in the front wall of the cartridge. A spring (not shown) maintains a predetermined pressure or force on the fingers and thus on the pressure plate to hold cards contained within the cartridge in a vertical plane.

In operation, the apparatus disclosed in FIGS. 1–6 cycles as follows: A card selection cycle is initiated with the previously described apparatus oriented as illustrated in FIG. 1. Specifically, the cartridge is out of vertical alignment with a vertical plane 25 which passes through the air nozzle 355 and the nip of the rollers 470, 471. Specifically, it is displaced to the left as viewed in that figure.

Figure 2:
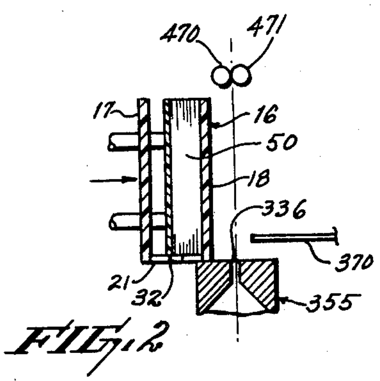
FIG. 2 is a diagrammatic illustration similar to FIG. 1 but illustrating the information retrieval system in a different and later portion of the information retrieval cycle.
Figure 3:
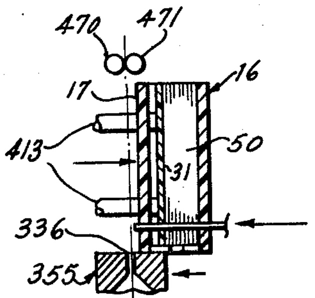
FIG. 3 is a view similar to FIG. 2 but illustrating the system in a different and later portion of the card retrieval cycle.

Upon initiation of a card selection cycle, the spider fingers 413 are inserted through the front wall of the cartridge so as to effect rearward movement of the pressure plate 31. This rearward movement compresses the deck of cards contained in the cartridge or compartment 16 and effects accurate alignment of the needle apertures 53 of the cards with apertures of the cartridge. This step of the cycle is illustrated in FIG. 2.

The cartridge 16 including the pressure plate 31 and the spiders 413 are then moved rightwardly relative to the nozzle 355, the rollers 470, 471, and the stationary sorting rods or needles 370. Selected ones of the needles are held stationary while the remainder of the needles are allowed to move rightwardly with the movement of the cartridge 16. Frictional contact of the cartridge with the unselected needles causes the unselected needles to move to the right relative to the restrained ones of the selector needles 370 (see FIG. 3).

Figure 4:
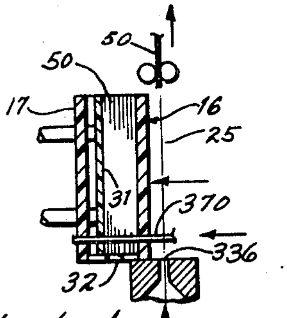
FIG. 4 is a view similar to FIG. 3 but illustrating the system in a different and later portion of the card retrieval cycle.

Thereafter the cartridge 16 together with the selected sorting rods or needles 370 which extend through apertures in the front and rear walls of the cartridge are moved to the left as viewed in FIG. 4 while the air stream is directed through the orifice 336 of the nozzle 355 and into the deck of cards 50. This air stream has sufficient velocity to overcome the compression of the deck caused by the pressure plate 31 so as to momentarily isolate and entrap each individual card within the air stream while that card is located over the nozzle orifice 336. Thus, as the cartridge is moved relative to the nozzle orifice 336, the air stream emitted from the orifice momentarily entrains each card in the stream and any unrestrained card or card which is notched at the site of all needles 370 then extending through the cartridge is caused to move upwardly with the air stream. The upwardly moving preselected card is directed into the nip of the drive rolls 470, 471 which then continue the upward movement of the card completely out of the deck.

When the cartridge reaches the leftwardmost extent of its movement, as illustrated in FIG. 4, all of the preselected cards will have been ejected from the deck.

Figure 5:
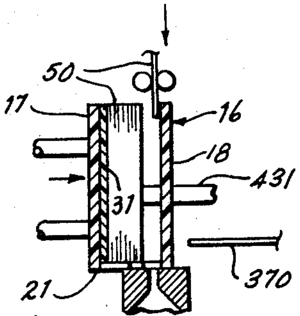
FIG. 5 is a view similar to FIG. 4 but illustrating the system in a different and later portion of the card retrieval cycle.
Figure 6:
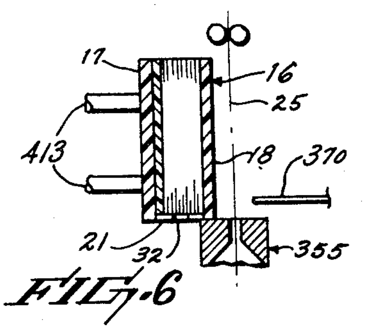
FIG. 6 is a view similar to FIG. 5 but illustrating the system at the completion of an information storage cycle and after the return of a selected card to the file.
Figure 8:
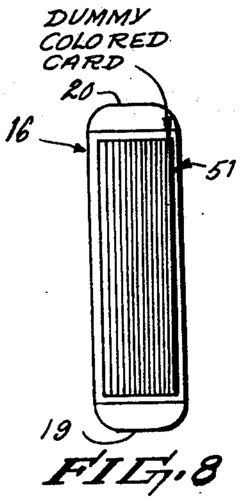
FIG. 8 is a top plan view of the card storage compartment of FIG. 1 with a dummy card stored in a position to initiate a card activity check.
Figure 9:
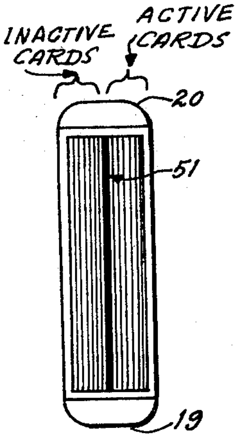
FIG. 9 is a view similar to FIG. 8 but illustrating the status of the dummy card a predetermined time after initiation of the activity check and after the dummy card has isolated inactive cards from active ones.
Figure 7:
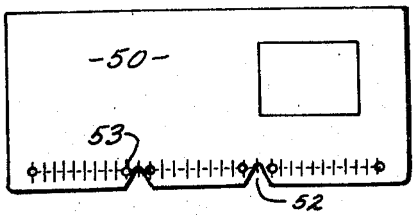
FIG. 7 is a front elevational view of a card of the type employed in the system of FIG. 1.

To return a used card to the file or to infile a new card into the file, deck compresser fingers 431 are inserted through apertures in the rear wall 18 of the cartridge 16. The cartridge is then moved rightwardly to compress the deck of cards in the cartridge and move them to the left against the force of the pressure plate 31. The force applied by the compression fingers 431 is greater than the force applied to the deck by the compression plate 31 and the spider fingers 413 so the deck moves to the left side of the cartridge as illustrated in FIG. 5. This causes the deck to be opened beneath the nip of the rollers 470, 471. The used card 50 is then driven downwardly by the rollers 470, 471 into the opening provided by the compression fingers between the last card in the deck and the rear wall 18 of the cartridge. The compression fingers enter at the sides of the deck and are so configurated that they permit the returning card to be returned into the cartridge without interference between the returning card and the compression fingers 431.

After the selected and used card has been returned to the file, the cartridge is again moved leftwardly and the spider fingers 413 are withdrawn from the front wall of the cartridge. The cartridge may then be replaced with a new one, or the cycle may be repeated using the same cartridge but with the same or different sorting rods or needles 370 inserted into the cartridge.

The structure and cycle of operation heretofore described with reference to FIGS. 1–6 are conventional and form no part of the invention of this application. That apparatus is completely described in U.S. Pat. No. 3,536,-194, the disclosure of which patent is incorporated by reference for purposes of completing the disclosure of this application.

The invention of this application is concerned with isolating and identifying inactive cards in the cartridge 16. In order to maintain a file of active cards and eliminate cards as they become obsolete or inactive, some action must be taken to identify the inactive or obsolete cards. This is accomplished according to the practice of this invention by inserting a distinctive dummy card 51 into the rear of the deck of cards in the cartridge at the infile position of the cartridge. In other words, to initiate an activity check, a distinctive card or so-called dummy card 51 is inserted into the deck at the rear or adjacent the wall 18. Thereafter, any cards extracted from the cartridge 16 and returned are inserted behind the dummy card. All inactive cards remain in the front of the dummy card or on the side of the dummy card adjacent the front wall 17 of the cartridge.

The dummy card is generally identical to all other cards in the cartridge except for its distinctive characteristic, as for example color, and its distinctive notching or coding. Generally, the dummy card has holes at all notch sites and no notches so that it is not normally extracted or selected from the deck by the selection system. Alternatively, though, it may have distinctive notches, so that it may be extracted automatically by actuation of a unique combination of selection needles or selectors.

If, as an example, one year after a dummy card 51 is inserted into a cartridge, a person desires to extract all cards which have been unused or which have not been extracted from the file during the one-year time period, all that is required is to remove the inactive cards from the front side of the dummy card 51. Preferably this card is very distinctive, as, for example, is of a specific color.

It is also possible according to the practice of this invention to insert multiple dummy cards into each cartridge, as for example, one each month of a distinctive marking or color. Thereafter, the cards which have been unused for a specific length of time (as, for example, one year) may be removed monthly or according to whatever time schedule is necessary to maintain the file according to the particular application for which it is intended.

While I have described only a single preferred embodiment of a file to which the invention of this application is applicable, persons skilled in the information storage and retrieval arts will readily appreciate other systems to which the invention is equally applicable. Specifically, any system in which cards are always infiled into the deck in the same relative position may incorporate this card activity checking system. Therefore, I do not intend to be limited except by the scope of the appended claims.

Having described my invention, I claim:

1. The method of checking the removal activity of edge coded cards in a multiple card file in which a plurality of cards are serially arranged in a stack and are stored in a file compartment, which method comprises nonserially selecting and removing edge coded cards from the file, returning all previously selected cards to the file at the same relative infile position in the compartment, and initiating an activity check of cards stored in the file by inserting a distinctive dummy card in the file at the infile position of the compartment so that all cards thereafter removed and returned to the file are located on one side of the dummy card and all unselected cards are located on the other side of the dummy card.

2. The method of claim 1 in which the infile position is located at one end of the stack of cards contained in the file.

3. The method of checking the removal activity of edge coded cards in a multiple card file in which a plurality of cards are serially arranged in a stack and are randomly stored in a file compartment, which method comprises restraining all but preselected cards in the file while permitting preselected cards to be removed, removing the preselected unrestrained cards from the file while restraining the remainder of the cards against removal, returning all previously selected cards to the file at the same relative infile position in the compartment, and initiating an activity check of cards stored in the file by inserting a distinctive dummy card in the file at the infile position so that all cards thereafter removed and returned to the file and located on one side of the dummy card and all unselected cards are located on the other side of the dummy card.

4. The method of claim 3 in which the infile position is located at one end of the stack of cards contained in the file.

References Cited

UNITED STATES PATENTS

| | | | |
|---|---|---|---|
| 3,490,587 | 1/1970 | Irasek | 209—80.5 |
| 1,246,310 | 11/1917 | Niswanger | 40—78 |

ALLEN N. KNOWLES, Primary Examiner